(12) United States Patent
Dooley et al.

(10) Patent No.: US 8,476,798 B2
(45) Date of Patent: Jul. 2, 2013

(54) TANDEM ELECTRIC MACHINE ARRANGEMENT

(75) Inventors: Kevin Allan Dooley, Mississauga (CA); Joseph Brand, Mississauga (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 474 days.

(21) Appl. No.: 12/324,941

(22) Filed: Nov. 28, 2008

(65) Prior Publication Data
US 2010/0133835 A1     Jun. 3, 2010

(51) Int. Cl.
*H02K 7/20* (2006.01)
(52) U.S. Cl.
USPC .......................................... 310/112; 310/114
(58) Field of Classification Search
USPC .................................. 290/52; 310/112, 114
See application file for complete search history.

(56) References Cited

U.S. PATENT DOCUMENTS

| | | | |
|---|---|---|---|
| 1,764,714 A * | 6/1930 | Boykow | ........................ 310/112 |
| 2,006,172 A | 6/1935 | Klappauf | |
| 2,454,120 A | 11/1948 | Atwell et al. | |
| 2,857,534 A * | 10/1958 | Beach | ............................. 310/74 |
| 3,459,980 A | 8/1969 | Coroller | |
| 3,508,091 A | 4/1970 | Kavanaugh | |
| 3,633,055 A | 1/1972 | Maier et al. | |
| 3,728,567 A | 4/1973 | Picmaus | |
| 4,211,945 A | 7/1980 | Tawse | |
| 4,297,604 A | 10/1981 | Tawse | |
| 4,434,389 A | 2/1984 | Langley et al. | |
| 4,550,267 A | 10/1985 | Vaidya | |
| 4,663,581 A | 5/1987 | Glennon | |
| 4,782,257 A | 11/1988 | Secher et al. | |
| 4,918,347 A | 4/1990 | Takaba | |
| 5,130,595 A | 7/1992 | Arora | |
| 5,144,178 A | 9/1992 | Sugiura | |
| 5,177,388 A | 1/1993 | Hotta et al. | |
| 5,227,702 A * | 7/1993 | Nahirney | ................. 318/400.41 |
| 5,245,238 A | 9/1993 | Lynch et al. | |
| 5,254,894 A | 10/1993 | Satake et al. | |
| 5,260,642 A | 11/1993 | Huss | |

(Continued)

FOREIGN PATENT DOCUMENTS

| | | |
|---|---|---|
| DE | 10310777 A1 * | 9/2004 |
| EP | 0754365 B1 | 2/1998 |

(Continued)

OTHER PUBLICATIONS

Canadian Intellectual Property Office; Examiners Requisition dated Jun. 6, 2011.

(Continued)

*Primary Examiner* — Thanh Lam
(74) *Attorney, Agent, or Firm* — Norton Rose Canada LLP

(57) ABSTRACT

The tandem electric machine arrangement comprises an outside rotor having two axially spaced-apart sets of circumferentially-disposed permanent magnets. It also comprises an inside stator having at least two electrically-independent windings, the at least two windings axially spaced apart from one another and disposed relative to the magnet sets to thereby be magnetically coupled to a respective one of the sets of permanent magnets during rotation of the rotor. One of the rotor and the stator is provided in two separate pieces, each piece supported from opposite axial sides of the electric machine relative to one another. The other of the rotor and the stator is supported from substantially centrally of the two pieces.

10 Claims, 3 Drawing Sheets

U.S. PATENT DOCUMENTS

| | | | |
|---|---|---|---|
| 5,270,604 A | 12/1993 | Sandel et al. | |
| 5,530,308 A | 6/1996 | Fanning et al. | |
| 5,793,137 A | 8/1998 | Smith | |
| 5,838,085 A * | 11/1998 | Roesel et al. | 310/113 |
| 5,929,549 A | 7/1999 | Trago et al. | |
| 5,955,809 A | 9/1999 | Shah | |
| 6,020,711 A | 2/2000 | Rubertus et al. | |
| 6,043,579 A * | 3/2000 | Hill | 310/164 |
| 6,158,405 A * | 12/2000 | Masberg et al. | 123/192.1 |
| 6,481,526 B1 | 11/2002 | Millsap et al. | |
| 6,484,839 B2 | 11/2002 | Cole | |
| 6,765,328 B2 | 7/2004 | Razzell et al. | |
| 6,794,781 B2 | 9/2004 | Razzell et al. | |
| 6,885,130 B2 | 4/2005 | Faltin | |
| 7,023,121 B2 | 4/2006 | Kusase et al. | |
| 7,112,905 B2 | 9/2006 | Chang et al. | |
| 7,683,515 B2 * | 3/2010 | Leiber et al. | 310/156.26 |
| 2003/0102758 A1 | 6/2003 | Kusase et al. | |
| 2003/0230947 A1 | 12/2003 | Islam et al. | |
| 2007/0007837 A1 | 1/2007 | Mukai et al. | |
| 2010/0133835 A1* | 6/2010 | Dooley et al. | 290/52 |

FOREIGN PATENT DOCUMENTS

| | | |
|---|---|---|
| EP | 1296443 A2 | 3/2003 |
| EP | 1296443 A3 | 1/2004 |
| FR | 1555855 | 12/1968 |
| JP | 9247912 | 9/1997 |
| RU | 2050672 C1 | 12/1995 |
| WO | WO94/14226 | 6/1994 |
| WO | WO95/17035 | 6/1995 |
| WO | WO95/34117 | 12/1995 |

OTHER PUBLICATIONS

Canadian Intellectual Property Office; Response to Examiner's Requisition and Voluntary Submission of Information dated Dec. 5, 2011.

Canadian Intellectual Property Office; Examiner's Requisition dated Mar. 14, 2012.

Canadian Intellectual Property Office; Response to Examiners Requisition dated Mar. 14, 2012.

* cited by examiner

TANDEM ELECTRIC MACHINE ARRANGEMENT

TECHNICAL FIELD

The technical field generally relates to electric machines and in particular to tandem arrangements therefor.

BACKGROUND

Power generation, particularly for use with motive applications such as vehicles of various sorts, is constantly in need of improvements to power density (i.e. power to weight ratio), not to mention increased reliability and smaller envelopes, to name but a few concerns. But these demands tend to be at odds with one another. The inclusion of multiple motor/generators provides higher reliability, but increases weight and the on-board envelope required. Increasing the driving speed of generators, in particular, can increase the generated power density (more power, less space and weight), but higher-speed applications tend to have more complicated dynamics and rotor balancing issues, and the problems are further compounded if a plurality of such machines are provided.

SUMMARY

In one aspect, the present concept provides a tandem arrangement for an electric machine. It comprises an outside rotor having two axially spaced-apart sets of circumferentially-disposed permanent magnets; an inside stator having at least two electrically-independent windings, the at least two windings being axially spaced apart from one another and disposed relative to the magnet sets to thereby be magnetically coupled to a respective one of the sets of permanent magnets during rotation of the rotor. One of the rotor and the stator is provided in two separate pieces, each piece being supported from opposite axial sides of the electric machine relative to one another. The other of the rotor and the stator is supported from substantially centrally of the two pieces.

In another aspect, the present concept provides a tandem electric machine arrangement comprising a central support and two axially spaced-apart end supports, the central support being disposed centrally of the two end supports, the electric machine having two rotor-stator pairs, the pairs being axially spaced apart from one another between the two end supports, each rotor-stator pair comprising a rotatable rotor surrounding a stator, the two rotors being coaxial with one another and mounted to an axially-extending shaft, the two stators each having a winding set, the winding sets of the two stators being electrically independent of one another, the rotor-stator pairs being mounted such that one of the two rotors and the two stators are mounted together axially end-to-end to one another and supported by the central support, the other of the two rotors and the two stators being axially spaced-apart from one another and mounted to a respective one of the end supports.

Further details of these and other aspects of the improved arrangement will be apparent from the detailed description and figures included below.

DETAILED DESCRIPTION

Figure 1:
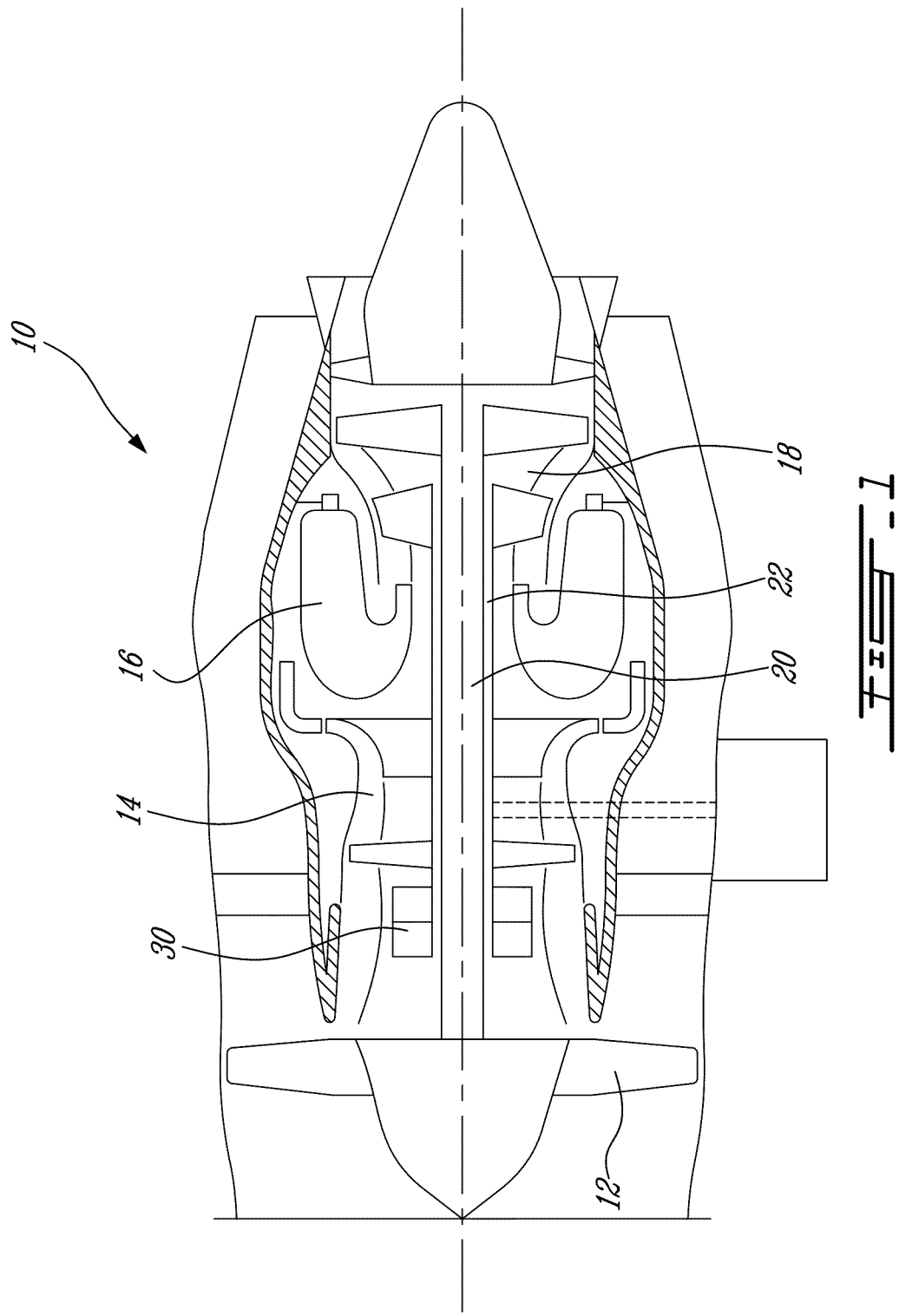
FIG. 1 schematically illustrates an example of a gas turbine engine provided with an example of an electric machine.

FIG. 1 illustrates an example of a dual-spool gas turbine engine 10 generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes a low pressure (LP) engine spool shaft 20 and a high pressure (HP) engine spool shaft 22. Both engine spool shafts 20, 22 are coaxial in FIG. 1. This figure also shows schematically an example of an electric machine arrangement 30 being coaxially mounted around an extension of the HP engine spool shaft 22. The electric machine arrangement 30 is a tandem type machine, comprising two electric machines coaxially mounted on the shaft 22, as will be described in more detail below.

It should be noted from the outset that FIG. 1 only illustrates one among many possible example applications in which the machine presented herein can be used. For instance, the electric machine 30 can be used in any suitable application, such as other gas turbine engine types or other vehicles, and still other suitable applications exist, as will be appreciated by the skilled reader.

Figure 2:
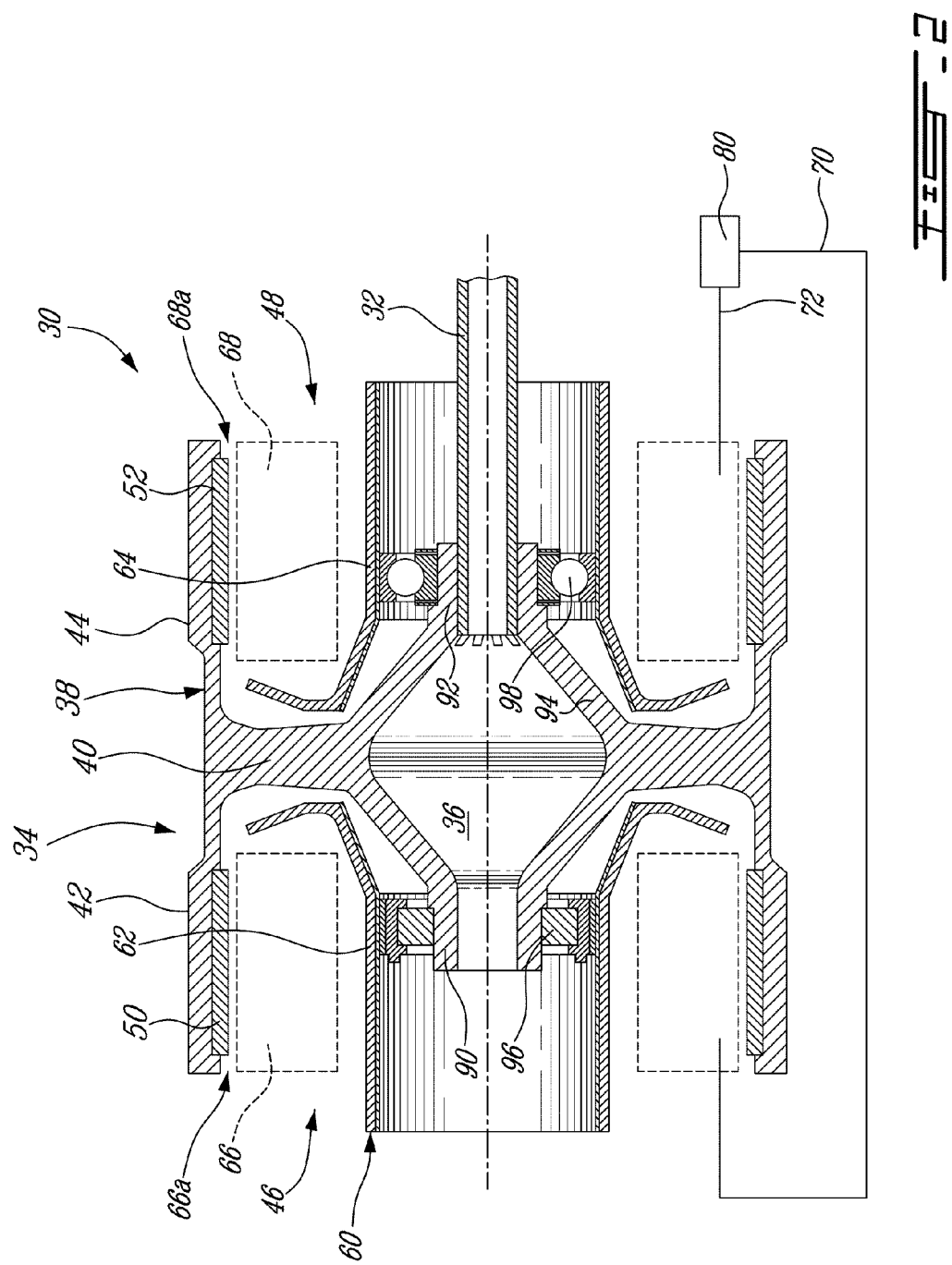
FIG. 2 is a cross-section view showing an example of the improved tandem electric machine arrangement.

FIG. 2 is a cross-section view of an example of the electric machine 30. The electric machine 30 is coaxially mounted with reference to a central drive or output shaft, in this example an engine spool shaft 32, which shaft can include for instance a quill shaft as shown in FIG. 2. Other suitable types of shafts can be used instead. The electric machine 30 comprises a rotor 34 having a radially-inner portion 36 and a radially-outer portion 38. Both portions 36, 38 are interconnected by an intermediary portion 40 located substantially at a middle location of the electric machine 30 with reference to the axial direction. This intermediate portion 40 extends substantially radially in the illustrated example. The radially-inner portion 36 of the rotor 34 is in a torque-transmitting engagement with the engine spool shaft 32, as explained later in the text.

The radially-outer portion 38 of the rotor 34 of the illustrated example is generally cylindrical in shape. It comprises two opposite sections 42, 44 axially extending with reference to the intermediate portion 40. The sections 42, 44 define opposite open-ended spaces 46, 48 within the rotor 34, one being at the left and the other being at the right in FIG. 2. Each section 42, 44 includes a set of circumferentially-disposed permanent magnets 50, 52 of alternating polarities.

The electric machine 30 shown in FIG. 2 comprises a two-part stator 60, one stator part 62 being at the left and the other stator part 64 being at the right in FIG. 2. Each stator part 62, 64 at least partially extends within a corresponding one of the open-ended spaces 46, 48 of the rotor 34. Each stator part 62, 64 includes a winding 66, 68 separated from a corresponding one of the sets of permanent magnets 50, 52 by a radial air gap 66a, 68a. It should be noted that the windings 66, 68 are schematically illustrated in FIG. 2.

Each stator part 62, 64 is supported from outside the electric machine 30 and wires 70, 72 extend from the sides of the electric machine 30. Each winding 66, 68 is magnetically coupled to the corresponding set of permanent magnets 50, 52 during the rotation of the rotor 34. As can be seen, the electric machine 30 is constructed as a brushless machine.

The electric machine 30 can be operatable as a generator, as a starter, or as a starter/generator integrating the two functions in a single device. When the electric machine 30 can be operated at least as a generator, both windings 66, 68 of the stator 60 are electrically independent from each other. The electric machine 30 can include a controller 80 to selectively combine and disconnect the electrical outputs provided by the wires 70, 72 of the windings 66, 68. Thus, the electric machine 30 can be arranged as a dual redundant system or as a generator with combined outputs delivering twice the normal power output obtained from each side. The controller 80 can be part of the electric machine 30 itself or be an external device. The electric machine 30 can also be permanently configured in one way or the other.

FIG. 2 further shows that the radially-inner portion 36 includes two sleeve members 90, 92 spaced apart in the axial direction. The sleeve members 90, 92 of the illustrated example are in a torque-transmitting engagement with the engine spool shaft 32. For instance, this engagement can be made using a spline (not shown). Other arrangements are possible as well. Still, the sleeve members 90, 92 are interconnected by an intermediate member 94. In the illustrated example, the inner side of the intermediary portion 40 is connected to an outer side of the intermediate member 94 of the radially-inner portion 36. Also, each sleeve member 90, 92 is connected to a corresponding stator part 62, 64 by a corresponding bearing 96, 98. The two bearings 96, 98 are located within axial boundaries of the electric machine 30.

Figure 3:
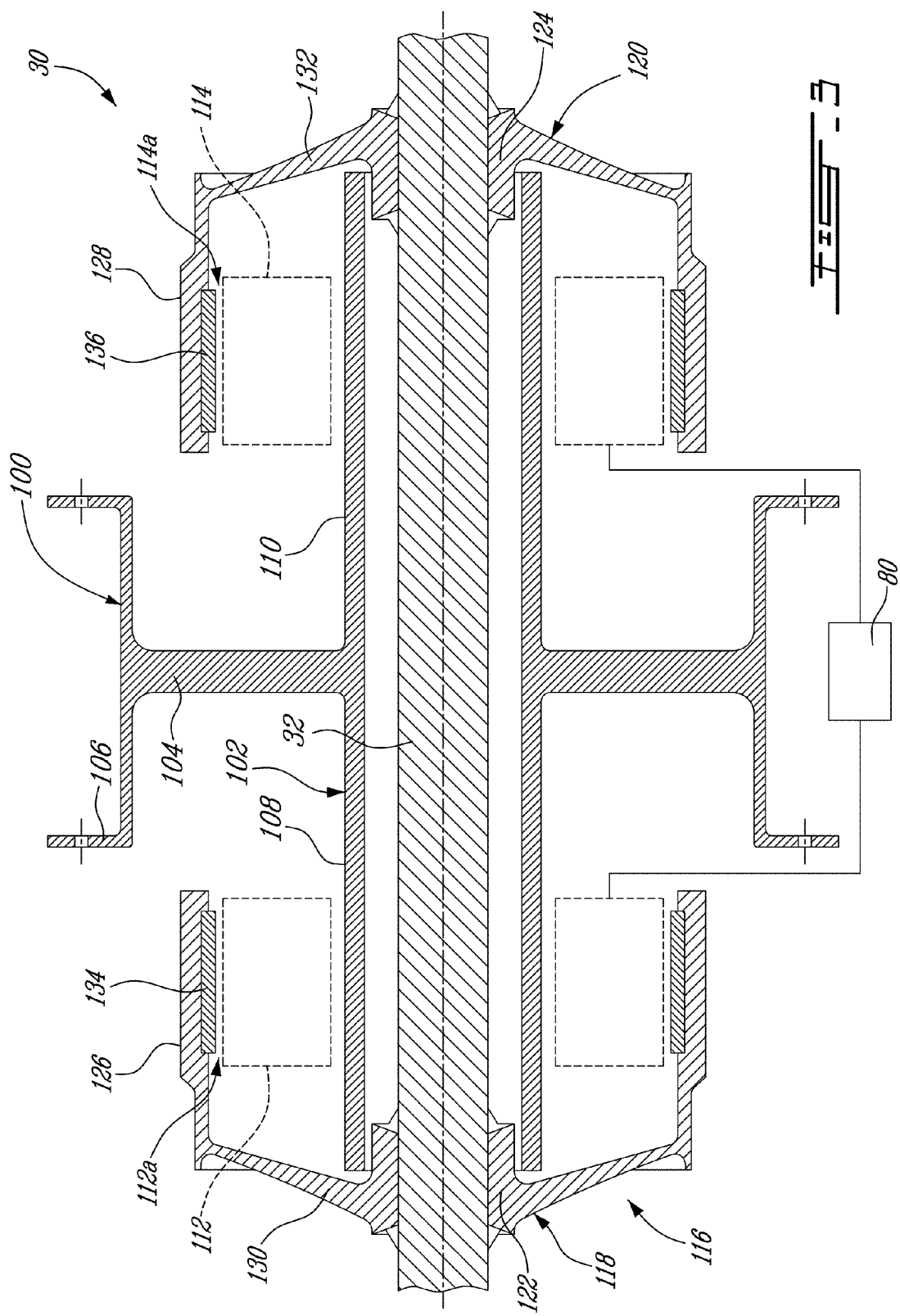
FIG. 3 is a cross-section view showing another example of the improved tandem electric machine arrangement.

FIG. 3 is a cross-section view of another example of the electric machine 30. This electric machine 30 comprises a stator 100 including an inner portion 102 coaxially disposed with reference to a central drive or output shaft 32, for instance an engine spool shaft of a gas turbine engine, when the electric machine 30 is mounted thereon. The inner stator portion 102 is supported from outside the electric machine 30 through a radially-extending medial support 104. The support 104 includes flanges 106 for connecting the stator 100 of the electric machine 30 to a fixed location, for instance a fixed location in a gas turbine engine. The inner stator portion 102 also has two opposite sections 108, 110 axially extending with reference to the radially-extending medial support 104. Each section 108, 110 of the inner stator portion 102 is at least partially cylindrical and has a corresponding winding 112, 114 mounted thereon. It should be noted that the windings 112, 114 are schematically illustrated in FIG. 3.

The electric machine 30 of FIG. 3 comprises a two-part rotor 116 that is coaxially disposed around the engine spool shaft 32 and is designed to be in a torque-transmitting engagement therewith. The rotor 116 has two separate parts 118, 120, one being at the left and the other being at the right in FIG. 3. Each rotor part 118, 120 includes a sleeve member 122, 124. In the illustrated example, the rotor parts 118, 120 are only connected to each other by the engine spool shaft 32. Each rotor part 118, 120 also comprises an overhang 126, 128 encircling a corresponding one of the windings 112, 114. Each overhang and the corresponding sleeve member 122, 124 are interconnected by a conical flange 130, 132 located at an axial end of the electric machine 30. Each overhang 126, 128 includes a set of circumferentially-disposed permanent magnets 134, 136. The permanent magnets 134, 136 and the corresponding windings 112, 114 on the stator 100 are separated by a radial air gap 112a, 114a. As can be seen, the electric machine 30 is constructed as a brushless machine.

When the electric machine 30 is operatable at least as a generator, the windings 112, 114 are electrically independent from each other. If desired, the controller 80 described for FIG. 2 can also be provided in the example of FIG. 3, as shown, to selectively combine and disconnect electrical outputs of the windings 112, 114. The electric machine 30 can also be permanently configured in one way or the other.

As can be appreciated, the concept presented herein can provide a light and compact electric machine 30 having good high speed rotordynamic stability. This can be useful for many applications, including for high power applications (for instance, 75 kW or more) and high rotational speeds (for instance, 35 kRPM or more).

The above description is meant to be exemplary only, and one skilled in the art will recognize that changes may be made to the embodiments described without departing from the scope of the invention disclosed. For example, the word "generator" or "generators" is used in a generic sense and has the same meaning as the word "alternator" or "alternators", respectively. The stator windings can each have one or more phases. Also, the two sides of the electric machine do not necessarily need to be identical or symmetric, although the examples shown in FIGS. 2 and 3 are identical and symmetric with reference to a medial radial plane. Still other modifications which fall within the scope of the present invention will be apparent to those skilled in the art, in light of a review of this disclosure, and such modifications are intended to fall within the appended claims.

What is claimed is:

1. A tandem arrangement for an electric machine comprising:
   an outside rotor having two axially spaced-apart sets of circumferentially-disposed permanent magnets;
   an inside stator having at least two electrically-independent windings, the at least two windings axially spaced apart from one another and disposed relative to the magnet sets to thereby be magnetically coupled to a respective one of the sets of permanent magnets during rotation of the rotor;
   wherein the stator is provided in two separate pieces, each piece supported from opposite axial sides of the electric machine relative to one another; and
   wherein the rotor is supported from substantially centrally of the two pieces and a bearing is disposed between a radially-inner portion of the rotor and the stator, the radially-inner portion of the rotor being configured for torque-transmitting engagement with a shaft, the radially-inner rotor portion including two axially spaced-apart sleeve members interconnected by an intermediate member defining an internal cavity unfilled by the shaft during torque-transmitting engagement, at least a portion of the internal cavity having a conical shape.

2. The electric machine arrangement as defined in claim 1, wherein each stator piece is at least partially extending inside the rotor from a respective one of the opposite axial sides of the electric machine.

3. The electric machine arrangement as defined in claim 2, wherein the radially-inner portion of the rotor and a radially-outer portion of the rotor are interconnected by an intermediate rotor portion, the radially-outer portion of the rotor having two opposite sections axially extending with reference to the intermediate portion of the rotor, the sections defining opposite open-ended spaces facing away from one another, each section including a respective one of the sets of permanent magnets.

4. The electric machine arrangement as defined in claim 3, wherein the shaft is a main shaft of a gas turbine engine and the electric machine is mounted coaxially with the main shaft.

5. A tandem electric machine comprising:
   two rotor-stator pairs axially spaced apart from one another, each rotor-stator pair comprising a rotor surrounding a stator, the two rotors being coaxial with one another and mounted to an axially-extending shaft, the two stators each having a winding set, the winding sets of the two stators being electrically independent of one another, the two rotors being mounted together axially end-to-end to one another and supported by an intermediate rotor portion disposed between the two rotor-stator pairs and a radially-inner rotor portion in torque-transmitting engagement with the shaft, the radially-inner rotor portion including two axially spaced-apart sleeve members interconnected by an intermediate member defining an internal cavity unfilled by the shaft during torque-transmitting engagement, at least a portion of the internal cavity having a conical shape; and a bearing disposed between the radially-inner rotor portion and at least one of the stators.

6. The tandem electric machine as defined in claim 5, wherein the radially-inner rotor portion and a radially-outer rotor portion are interconnected by the intermediate rotor portion, the radially-inner rotor portion being coaxially mounted with the shaft, the radially-outer rotor portion having two opposite sections axially extending with reference to the intermediate rotor portion, the sections defining opposite open-ended spaces facing away from one another, each section including a set of circumferentially-disposed permanent magnets, each magnet set being spaced apart from a respective one of the winding sets by a radial air gap.

7. The tandem electric machine as defined in claim 6, wherein the intermediate rotor portion is radially extending with reference to the shaft.

8. The tandem electric machine as defined in claimed 5, wherein an inner side of the intermediate rotor portion is connected to an outer side of the intermediate member of the radially-inner rotor portion.

9. The tandem electric machine as defined in claim 5, wherein one of the sleeve members is connected to an inner side of one of the stators by the bearing and the other sleeve member is connected to an inner side of the other stator by another bearing.

10. The tandem electric machine as defined in claim 6, wherein the shaft is a main shaft of a gas turbine engine, the rotors being coaxially mounted around the main shaft.

* * * * *